Jan. 2, 1962 P. H. TAYLOR 3,015,249
TRACKING TELESCOPE
Filed March 14, 1949 5 Sheets-Sheet 1

INVENTORS.
PHILIP H. TAYLOR
BY Herbert E. Metcalf
Attorney

Jan. 2, 1962 P. H. TAYLOR 3,015,249
TRACKING TELESCOPE
Filed March 14, 1949 5 Sheets-Sheet 4

INVENTOR.
PHILIP H. TAYLOR
BY
Hubert E. Metcalf
Attorney

Fig. 7

INVENTOR.
PHILIP H. TAYLOR
BY
Herbert E. Metcalf
Attorney

United States Patent Office 3,015,249
Patented Jan. 2, 1962

3,015,249
TRACKING TELESCOPE
Philip H. Taylor, Los Angeles, Calif., assignor to Northrop Corporation, Hawthorne, Calif., a corporation of California
Filed Mar. 14, 1949, Ser. No. 81,224
18 Claims. (Cl. 88—1)

This invention relates to optical systems, and more specifically to telescopic systems ideally suited for automatic star trackers.

In star tracking systems it is desirable to automatically track a star in such a manner that a usable intelligence can be derived, consisting of the measured or tracked star elevation with respect to some known reference plane established by the tracking means; and the measured or tracked star azimuth as indicated by the relation of the line of bearing of the star in the reference plane with respect to some known reference such as the direction of magnetic north.

This intelligence can be used to establish a relationship in space between the tracking means and the selected star as a part of essential information required to perform automatic celestial navigation or in any other manner where an instantaneous or continual reference to one of the heavenly bodies is required.

In accordance with the invention, an optical system constituting a properly adapted telescope having a restricted field of view brings all light within the area of the sky, defined by that field, to focus on the focal plane. An interesting star image appears at the focal plane as a point source of light (since all received rays from the star are essentially parallel) of small but finite size dependent upon the character and accuracy of the optics. Further, the light in the field from the adjacent sky, reflections from haze (which may be due to light sources in or out of the field), and the light from fainter stars in the field are also incident on the focal plane.

A suitable scanning means located in the focal plane of the optical system then discriminates between the focused light of the interesting star image and all other light in such manner that the focused star light provides the basis for elevation and azimuth error signals needed for tracking the star.

When a star tracker is mounted on an aircraft, it is desirable to so design and arrange the required components of the optical system that only relatively low mass, easily balanced elements need be moved. Moreover, it is desirable that the moving elements used for tracking are so arranged as to require only a small amount of swing space and so positioned that, from the standpoint of aerodynamic drag, only an extremely small area of the tracking equipment need be projected into the air stream while still providing adequate scanning of the interested star in azimuth and elevation.

It is therefore an object of this invention to provide a telescope ideally adapted for tracking a light radiating object such as a star.

It is another object of this invention to provide a novel combination of elements and arrangement of apparatus for tracking an object radiating light energy.

It is still another object of the invention to provide an optical system ideally adapted for use in aircraft, in that a minimum obstruction is placed in the airstream flowing past the craft.

In one preferred form, this invention comprises a telescope with a total reflective prism pivoted above its objective lens for perceiving and focusing an interesting star image at the focal plane. A scanning means provided at the focal plane of the telescope modulates this image into light pulses synchronous with a reference frequency that is identical to scanner rotation. The phase relationship between the star light pulses and the reference frequency indicates the direction of the star image from the center of the field of view of the telescope as defined by the intersection of the optical axis with the focal plane. A photocell passes the light pulses as electrical energy into an accompanying suitable servo network of filtering, amplification, clipping, and phase shifting which converts the existing phase relationship between light pulses and the reference into usable component potentials used by an azimuth drive and an elevation drive provided to drive the optical means in such a manner as to return the star image to the optical axis in the field of view at the focal plane. The intersection of the optical axis with the focal plane thus becomes the null position at which the optical means is maintained by the null seeking servo system and tracking of the selected star becomes a continuous operation. The measurable angle of the optical means to its supporting table as established by the driving motors constitutes the derived intelligence of the star's elevation with respect to the table. Moreover, azimuthal intelligence is derived by indexing against the line of bearing of the selected star. This continuously derived intelligence can be sensed by other systems and used for astronomical or navigational purposes.

The attached drawings illustrate a preferred embodiment illustrating the theory of operation of the invention. It is to be expressly understood, however, that the drawings are for the purpose of illustration only and are not designed as a definition of the limits of the invention, reference being had to the appended claims for that purpose.

Figure 1:
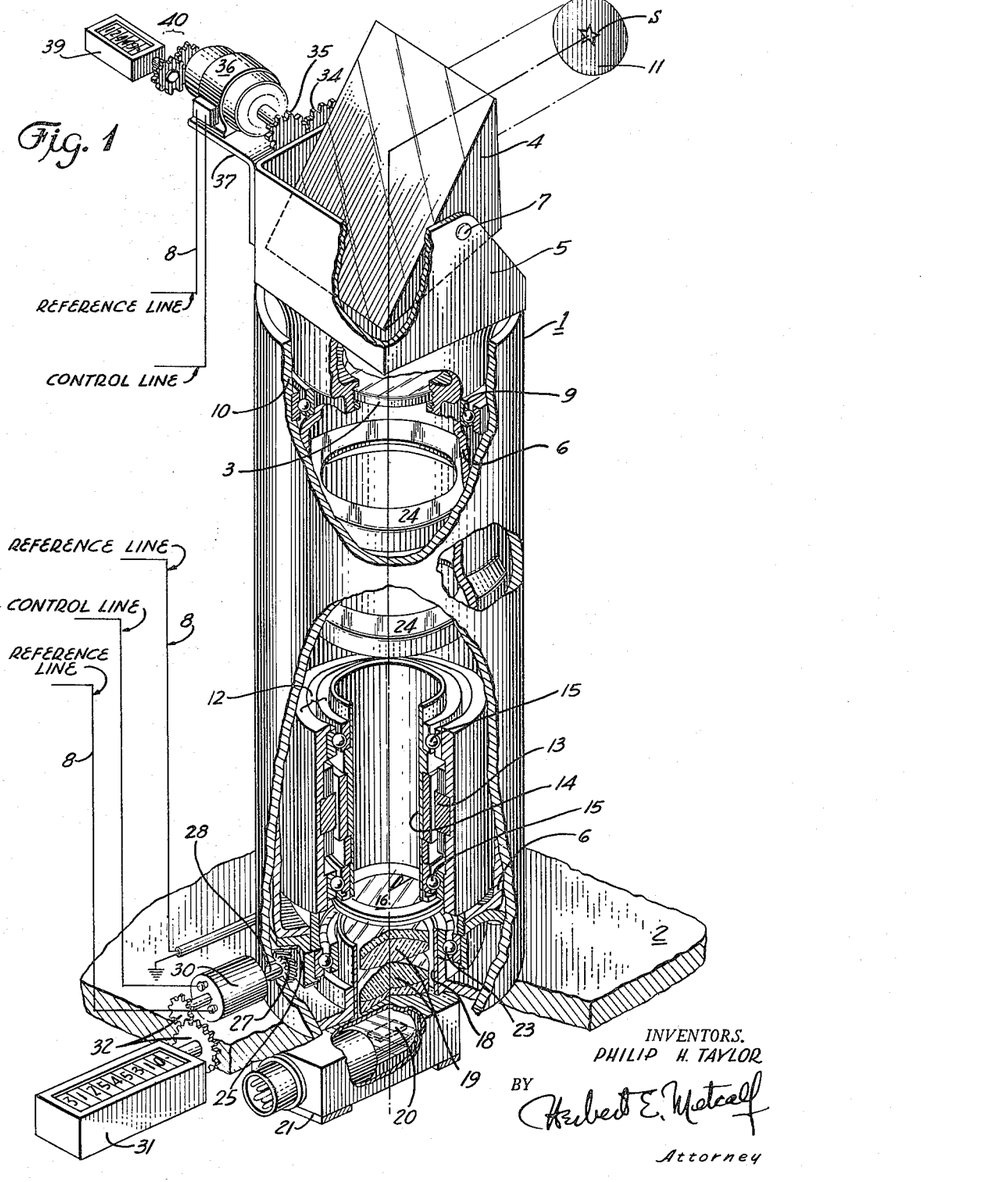
FIGURE 1 is a perspective view, partly in section, of a novel structure embodying the present invention.

Referring first to FIGURE 1, a telescope 1 is positioned with its optical axis preferably fixed normal to a gyro-stabilized table 2. Telescope 1, containing an aplanatic objective lens 3, receives light from an interesting star S and its surrounding field 11 by means of a reflecting prism 4 facing toward the star S. Prism 4 has two 35° angles and is mirrored on its back side. A suitable bracket 5, rigidly secured to the top of telescope barrel 6, supports prism 4 on a horizontal axis by means of trunnions 7, thus enabling the prism 4 to be rotated to track the star S in elevation.

Telescope barrel 6 is supported near its upper end on bearing 9 which holds the telescope 1 in the vertical position in a cylindrical housing 10 which is integral with and positioned normal to the gyro-stabilized table 2.

Concentrically positioned inside the lower portion of telescope barrel 6 is a scanner motor 12 comprised of a stator 13 fixed to the inner wall of the telescope barrel 6 and a hollow shaft rotor 14 rotating in bearings 15. The hollow shaft rotor 14 permits passage of light from the telescope field 11 and at the same time helps shield the focal plane from random light by acting as an effective baffle. Attached to the lower end of the rotor 14, to rotate therewith, and lying in the focal plane of the telescope 1 is a scanner disc 16. The surface of scanner disc 16 is opaque except for a 10° wedge having its apex at the center of rotation of the disc located at the null position of the field. The scanner disc 16 modulates the incident light into light pulses having a repetition rate equal to the rotation of synchronously driven scanner motor 12 which is energized by a reference frequency in reference frequency lead 8. Positioned concentrically with the cylindrical housing 10 and rigidly secured below the gyro-stabilized table 2 is a cylindrical bracket 18 which holds on a reduced diameter on its upper end thereof a set of achromatic collimating lenses 19. Lenses 19 receive the modulated light signal from scanner disc 16 and direct the signal onto the cathode of photocell 20 which is mounted directly below lenses 19 on a photocell bracket 21 attached below the table 2. The lower end of telescope barrel 6 seats bearing 23 by which it is mounted onto cylindrical bracket 18.

Baffles 24 are arranged within the telescope barrel 6 in such a manner as to shield the focal plane from most of the random light entering the telescope from sources other than the field of view 11.

Near the lower end of the telescope barrel 6, encircling the outer periphery thereof, a bevel gear 25 is attached. Gear 25 meshes with a drive gear 27 on shaft 28 extending through the side wall of cylindrical housing 10 and driven by an azimuth motor 30.

An azimuth counter 31 is attached to the shaft of azimuth motor 30 through reduction gearing 32. Azimuth counter 31 gives a continuous indication of the measured or tracked star azimuth as indicated by the relation of the line of bearing of the star in the gyro-stabilized reference platform 2 with respect to some known reference, e.g., the direction of magnetic north.

Prism trunnion 7 has a step-down gear 34 attached to its outer end which meshes with a drive gear 35 driven by an elevation motor 36. Elevation motor 36 is supported by a platform 37 secured to prism bracket 5.

Elevation motor 36 also has a similar counter 39 attached to be driven by reduction gears 40. Elevation counter 39 continuously indicates the measured or tracked star elevation with respect to the gyro-stabilized platform 2.

Figure 2:
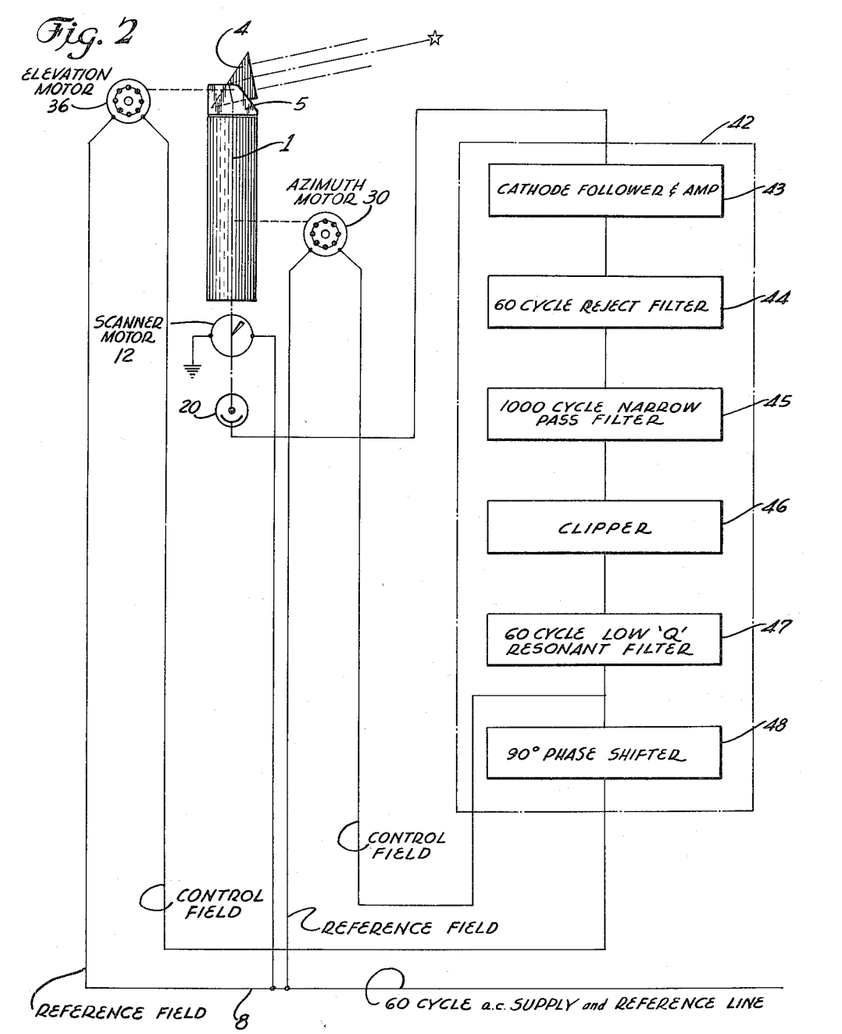
FIGURE 2 is a control signal network for the embodiment of the invention in FIGURE 1.

A servo system, for the structure of the invention illustrated in FIGURE 1, is shown in FIGURE 2 and includes the servo control signal network 42, the azimuth motor 30, the elevation motor 36, and supply line 8 supplying the reference fields of these motors and power to the scanner motor 12. The control signal network 42 consists of a cathode follower and amplifier 43, a 60-cycle reject filter 44, a 1000-cycle narrow pass filter 45, a clipper 46, a 60-cycle resonant filter (called a ringer) 47, and a phase shifter 48.

In order to understand fully the theory of the servo control signal network 42 of the present invention, the nature of the possible spurious signals due to the light in the field of view of the telescope 1 will be discussed.

In general, the light pattern of the field of view of the optical means employed in a star tracker consists of a distinguishable star image located in the field in accordance with the azimuth and elevation settings of the telescope directed to the star, as well as a background light from other sources which may be uniform or nonuniform.

A suitable photocell, placed in such a position that the light incident on the focal plane will fall on its cathode, converts that light into electrical energy directly related to the amount of light energy received. The photocell has no means of discriminating, however, and so the light received by it is modulated in some manner to provide qualitative intelligence for the photocell's output signals. This modulation is accomplished, in accordance with this invention, by a shutter arrangement between the focal plane and the photocell which is able to scan adjacent finite sections of the field of view in sequence. Each finite section has a photocell signal output characteristic of the light in that section. A complete scanning sequence from a known starting point through succeeding adjacent sections around the field and back to the starting position causes a cyclic signal output of the photocell that is qualitatively characteristic of the particular field scanned as a function of shutter position. By either providing or identifying the cyclic rate of the shutter with an electrical reference potential, the photocell signal is qualitatively characteristic of the field as a function of phase angle.

The three major component signals picked up by the photocell include spurious signals such as background light which, in general, is composed of light due to background whether gradient or uniform, and effects due to mechanical and optical misalignments, reflections, etc. These spurious signals are characterized by a frequency identical to that of the scanner. The component signal of the interested star is characterized by a square wave pattern while the signal of other local light sources, such as another star, is characterized also by a square wave of lower amplitude. Other local effects, such as optical aberrations, are assumed to be nullified by proper selection of the optical system, photocell characteristics, etc.

From the above, it is apparent that the wave frequency of the star image signal pulse is the same as that of the spurious signals and, therefore, discrimination on this basis is impractical. Discrimination on the basis of amplitude (due to intensity of light) is made difficult by the fact that in any general case the background can be of any and variable amplitude and the system is apt to home on the gradient or track in some centroidal manner. A scanner design which permits positive discrimination between the star pulse and accompanying spurious signals consists of scanner disc 16 which is all opaque except for a 10° wedge having its apex at the center of rotation of the scanner located at the null position of this field. Using scanner disc 16, the background spurious signal is characterized by a frequency equal to scanner rotation since it requires a complete scanner revolution to derive the wave form. The desired star image pulse, however, is of a much shorter duration and will consequently be characterized by a wave form of higher frequency with a repetition rate equal to scanner rotation frequency.

This pulse, being essentially of square wave form, is composed of harmonic components in accordance with a Fourier series. The pulse from another now interesting star in the field is similarly generated but of notably smaller amplitude. Practical discrimination of the interesting star image signal over all other signals on the basis of frequency filtering is now possible. By using scanner disc 16 with a 10° wedge, rotating at 60 c.p.s., the difference in signal characteristics is readily apparent. The background spurious signal remains a signal with the same frequency as the scanner disc 16 since its development depends on a complete revolution of the scanner. Its repetition rate is also 60 c.p.s. The interesting star image generates a pulse which may be considered as a complex wave of a series of higher frequency harmonics occurring with a repetition rate of 60 c.p.s. Although the repetition rate of the desired star pulse is equal to the repetition rate of the background and both are equal to background frequency, the important component frequencies of the star pulse lie about $$\tfrac{1}{2} \times 60 \times \frac{360}{10} = 1080 \text{ c.p.s.}$$

Thus, a filter of high pass characteristics is used which passes the higher component signals due to star light but rejects spurious signals due to background light at 60 c.p.s.

The signals from a fainter non-interesting star in the field are passed at lower amplitude, which can be properly clipped, so that it can be said that the interesting star signal is passed substantially free of spurious effects.

The phase relationship of this signal to the reference line is qualitative of star position in the field and is thus used in a suitable null seeking servo system to control the telescope position.

Signals derived from the photocell 20, in addition to those resulting from scanning, include high frequency effects due to photocell dark current, random signals due to instability of the tube, the effect of stray ions or electrons, and variations due to cathode non-uniformity. In general, these are of high frequency noise producing characteristics which are easily filtered, are of such low amplitude that they are ineffective, or are of such random nature as to leave the resonance due to the star pulse undisturbed in the servo system.

Optical errors, eccentricities in the mechanism, misalignments and adjustments result, in general, in a cyclic hum of scanner frequency and is filtered out of the servo signal directly. Other spurious signals of a local nature are either reducible to amplitude which will not unbalance the resonant output of the servo or are clipped.

Figure 3:
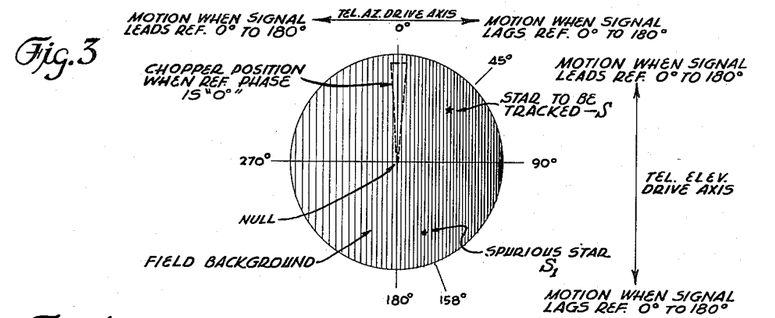
FIGURE 3 is a view of the focused field of the optical means.
Figure 4:
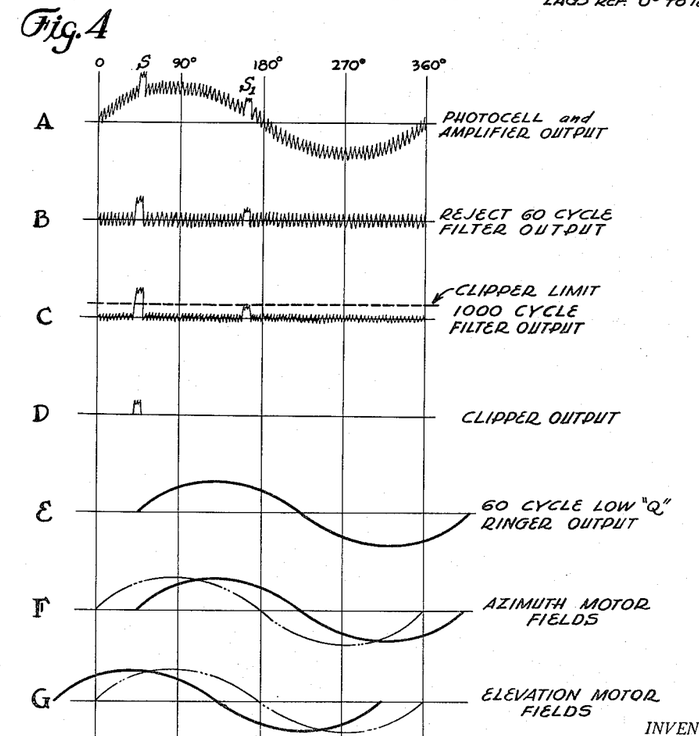
FIGURE 4 is a chart tracing the history of the signal picked up by the optical means.

Operation of the null seeking servo system, in view of the above discussion, may be seen by referring to FIGURES 2, 3, and 4. The assumed field of view is shown in FIGURE 3 to include an interesting star S to be tracked, a fainter spurious star $S_1$, and a gradient background light that is brightest at a reference phase angle of 90° and dimmest at 270°. The servo system has been designed to provide a coordinate system with the sign conventions of reference phase angle, scanner disc position, and drive control as shown. FIGURE 4, in conjunction with FIGURE 2, traces the history of the servo signal from the photocell 20 output to the azimuth and elevation control motors 30, 36 respectively. The photocell output is a feeble high impedence signal and is fed directly into a cathode follower 43 whose output, as shown in curve A of FIGURE 4, is a low impedance amplified signal with the same characteristics of the original photocell signal. This reduces the electro-static and electro-magnetic effects due to other circuits in the vicinity to inconsequence and permits the remaining components of the system to be located at some isolated area so that the entire mass of the system need not be swung by the servo motors. The signal is next passed through a 60-cycle reject filter 44 to remove the cyclic background effect due to gradient, misalignments, etc., caused by the 60 c.p.s. chopper rotation. The output of this filter, shown in curve B, will then contain the desired and spurious star pulses and photocell noise pulses. The 1000-cycle filter 45 passes the important harmonic components of the star pulses but there is a detectable difference in amplitude between the desired and spurious star pulses, as shown in curve C. Also, most of the photocell noise has been filtered except for that falling within the range of this filter which is generally of feeble character except for occasional random noise pulses of higher amplitude. The clipper 46 further isolates the desired star pulse, as shown by curve D, by passing pulses only above a certain amplitude. Thus, the spurious star pulse can be eliminated and only the desired star pulse plus whatever random noise pulses are still within the range of the clipper are passed. The signal is now passed into the 60-cycle low "Q" resonant filter 47 to recreate a 60-cycle signal (see curve E), based on the phase position of the star pulse, to be used in the drive motor control fields. The predominant 60-cycle star pulse frequency causes this filter to resonate at the desired phase angle. Spurious pulses still present can cause an amplitude and phase shimmer of this recreated wave but the random nature of these pulses cannot cause the ringer 47 to respond over the constant beat at 60-cycles due to the star pulse, and so adequate signal intelligence is established.

It is seen that if the photocell signal is filtered to pass the component signal of the interesting star image only, while the background and local spurious signals are either removed or reduced to ineffectiveness or not even registered by properly selecting the photocell, then a usable star signal is available to control a servo system driving the telescope, provided that a phase relationship is established between the signal and the driving motors.

In accordance with this invention, this phase relationship is established by synchronously driven scanner disc 16 maintaining a phase angle that is typical of its angular position in the field with respect to any arbitrarily selected coordinate system of the field. The reference fields of the two-phase motors 36, 30 driving the telescope 1 about these coordinate axes and the scanner motor 12 are referenced to each other by a common line which, in the case illustrated, is also the A.C. power supply line 8 so that the servo system receives positive position control signals from the interested star pulse based on star image position with respect to the selected axis.

Referring back to FIGURE 4, the 60-cycle output signal from the ringer 47, as shown by the solid curve F, is thus fed directly to the control field of azimuth drive motor 30. A parallel circuit from the ringer 47 feeds the 60-cycle output signal to a 90° phase shifter 48 before feeding it to the control field of the elevation motor 36. The solid curve G shows this elevation signal shifted 90° to the azimuth signal in curve F. The dashed curves F and G represent the 60-cycle reference frequency impressed on the reference fields of the control motors 30 and 36. The response of the two-phase balancing control motors, as determined by the selected conventions shown in FIGURE 3, will thus drive the telescope and prism until the star image reaches null.

Figure 5:
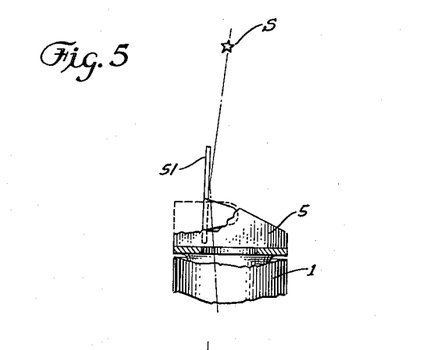
FIGURE 5 is a modification of the reflective means used in FIGURE 1.

It is to be noted by referring to FIGURE 5, that the desired deviation of the star light beam by the reflecting prism which enables the star light S to be received by the optics of the perpendicularly positioned telescope 1 can also be obtained by use of a pivoted mirror 51. The advantage of the prism is that it increases the effective angular range of light rays that can be picked up. For example, the light rays from a star can be picked up and reflected, due to the refraction of the prism, even though the mirrored surface on the prism 4 be substantially parallel to the light rays, whereas mirror 51 is not practical for tracking a star when so positioned with respect to its surface. However, the cost of eliminating optical inaccuracies inherent in prisms due to lack of homogeneity of the glass may be prohibitive in a particular application and thus the mirror may be the more preferable reflective means. Moreover, it is to be noted that if it is desirable to track a zenith star with the proposed arrangement, the telescope 1 must, for both instances, be positioned at an angle on the gyrostabilized table 2, and the mirror would consequently be as effective as the prism.

Figure 6:
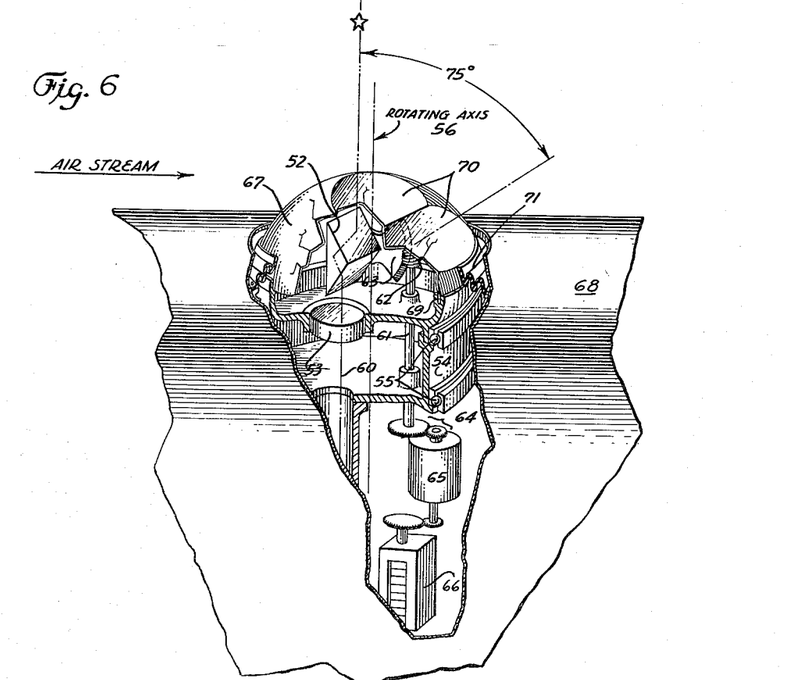
FIGURE 6 shows an embodiment of the invention installed in an aircraft.

Referring next to FIGURE 6, a partial embodiment of the invention useful for aircraft installations is schematically presented. For this case, a reflecting prism 52 is shown positioned above objective lens 53 and is assumed to be pivotally mounted on telescope housing 54 so that it rotates on a horizontal axis as previously described. Lens 53 is supported in telescope housing 54 which is journaled in bearings 55 to be rotated about its vertical axis 56 for tracking in azimuth. It should be noted that the optical axis 60 of the tracking system is not coincident with the telescope housing rotating axis 56 for this case. A rotating scanner and photoelectric cell, although not shown in this embodiment, are to be provided and positioned below objective lens 53 as previously described. Extending vertically through telescope housing 54, a drive shaft 61 with a worm gear 62 fixed on its upper end drives a sector gear 63 attached to the side of prism 52. On the lower end of shaft 61 reduction gearing 64 connects shaft 61 to an elevation motor 65 which thus drives the prism 52 in elevation. The measured elevation angle of the prism 52 is supplied by an elevation counter 66 driven in accordance with elevation motor 65. An azimuth drive motor, azimuth counter and connections (not shown in FIGURE 6) are to be associated with the telescope housing 54 as in the previously described embodiment.

The above tracking assembly is thus ideally arranged to have a spherical transparent dome 67 fitted over the prism 52 and its drive connection. Dome 67 is rigidly fixed to the outer top edge 69 of housing 54 to rotate therewith and is preferably positioned, as shown, with its symmetrical axis coincident with the rotating axis of housing 54. Partial walls with flat, optically corrected, surfaces 70 are ground on the dome 67 and positioned so that the light rays from a star, to be picked up by the prism 52, has minimum distortion when passing through the dome 67.

Thus the spherical transparent dome 67 can be protruded into the air stream above the normal contour of the fuselage 68 of an airplane. Since the housing 54 is to be on gyro-stabilized mountings (not shown) so as to be movable with respect to the airplane, a suitable flexible connection 71 is provided permitting relative movement between the dome 67 and the fuselage 68.

Hence a low-drag, alt-azimuth periscopic star tracker is provided the most significant feature of which being that only an extremely small area need be projected into the air stream while still providing more than 360 degrees scanning in azimuth, and from 15° to 90° in elevation.

Figure 7:
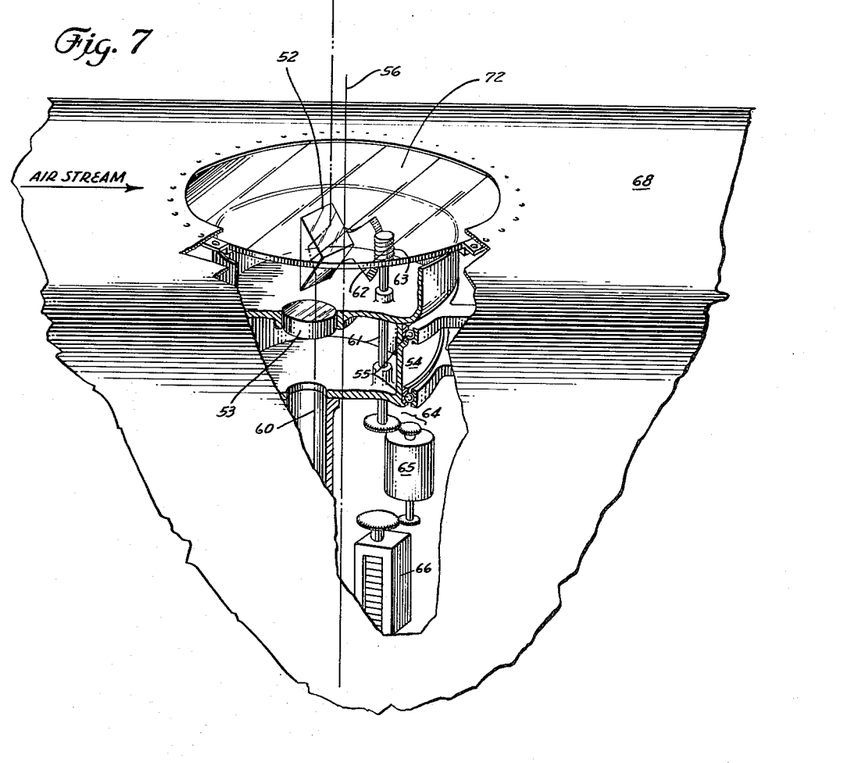
FIGURE 7 shows a modified installation of the invention in an aircraft.

Since in a supersonic missile, for instance, even the above small protrusion of the star tracking instrument is unacceptable, FIGURE 7 shows a modification of the partial embodiment of the invention for installation in an aircraft. Like numbers are given to identical parts in both schematic illustrations. Here, the tracking system is even more deeply submerged in the aircraft 68 and the housing 54 is to be mounted on a gyrostabilized platform, as before, but without the spherical dome 68. Instead, an optically ground transparent plate 72 is rigidly fixed as a window in the fuselage 68 through which the light rays from the star can be picked up by the prism 52. Plate 72 is circular and is of such a diameter that the range of view of the prism 52 is practically the same as for the spherical dome installation. This provides an absolutely flush design which, as has been stated, is admirably suited for use on a supersonic missile.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. An optical tracking system comprising a telescope mounted to be rotatable about an axis parallel to, but not coincident with, its optical axis, a bracket fixed on the upper end of said telescope, a reflecting prism pivoted in said bracket over the opening of said telescope, said prism receiving and deviating the image of an interesting star in the field of view into said telescope, said prism facing in a direction such that the line of sight from said star to said prism and thence into said telescope intersects and crosses the extended center line of said axis of rotation, and rotatable light-chopping means located in the focal plane of said telescope and arranged to form image light signals as said light-chopping means is rotated at a reference frequency, for indicating the direction of departure of said image from the center of said field of view, said tracking system being adapted to be installed within a structure having a window positioned across the field of view of said telescope and prism, with the center of said window substantially coincident with a point on said extended center line.

2. An optical tracking system comprising a telescope mounted to be rotatable about an axis parallel to, but not coincident with, its optical axis, a bracket fixed on the upper end of said telescope, reflecting prism pivoted in said bracket over the opening of said telescope, said prism receiving and deviating the image of an interesting star in the field of view into said telescope, said prism facing in a direction such that the line of sight from said star to said prism and thence into said telescope intersects and crosses the extended center line of said axis of rotation, scanning means located in the focal plane of said telescope, means whereby said scanning means modulates said image into light signals for determining the direction of departure of said image from the center of said field of view and means for rotating said telescope and said prism in accordance with said departure so as to return said image to the center of said field of view, said modulating means including an apertured disc exposed to said image and rotating at a known reference freqency within said telescope, said tracking system being adapted to be installed within a structure having a window positioned across the field of view of said telescope and prism, with the center of said window substantially coincident with a point on said extended center line.

3. An optical tracking system comprising a telescope vertically mounted to be rotatable about an axis parallel to, but not coincident with, its optical axis, a bracket fixed on the upper end of the telescope, a reflective prism horizontally pivoted in said bracket over the opening of said telescope, said prism receiving and deviating the image of an interesting star in the field of view into said telescope, said prism facing in a direction such that the line of sight from said star to said prism and thence into said telescope intersects and crosses the extended center line of said axis of rotation, scanning means located in the focal plane of said telescope, means whereby said scanning means modulates said image into light signals for determining the direction of departure of said image from the center of said field of view, means for rotating said telescope and said prism in accordance with said departure so as to return said image to the center of said field of view and means for continually indicating the rotated position of said telescope and of said prism, said modulating means including an apertured disc exposed to said image and rotating at a known reference frequency within said telescope, said tracking system being adapted to be installed within a structure having a window positioned across the field of view of said telescope and prism, with the center of said window substantially coincident with a point on said extended center line.

4. Apparatus in accordance with claim 3 wherein a hollow shaft scanner motor is provided, with said apertured disc fixed to said motor to rotate therewith, said motor being concentrically positioned inside the lower portion of said telescope surrounding said optical axis, and said disc being opaque except for a small sector therein.

5. An automatic star tracker and sextant comprising a telescope, a reference table, a cylindrical housing fixed normal to said table, said telescope concentrically mounted to rotate about its optical axis in said housing, a bracket fixed on the upper end of said telescope, a reflecting prism pivoted in said bracket over the opening of said telescope, a scanner motor concentrically positioned inside the lower portion of said telescope, said scanner motor consisting of a stator fixed to the inner wall of said telescope barrel and a hollow rotor to permit light rays to pass therethrough, a scanner disc positioned to receive said rays, said disc lying in the focal plane of said telescope and fixed to rotate with said rotor, baffles arranged in said telescope to help shield said focal plane from random light, a cylindrical bracket positioned below said scanner disc concentric with and supporting the lower end of said telescope and fixed to said table, a set of collimating lenses concentrically fixed in said cylindrical bracket, a photocell attached to said table below said lenses, a bevel gear encircling the outer periphery of said telescope, a drive gear meshing with said bevel gear, an azimuth motor, a shaft extending through said housing and connecting said drive gear to said azimuth motor, an azimuth counter attached to said azimuth motor, a reduction gear attached to the outer pivot of said prism, an elevation motor, said elevation motor driving said reduction gear, an elevation counter attached to said elevation motor.

6. An automatic star tracker and sextant comprising a telescope, a cylindrical housing, a reference platform, said cylindrical housing vertically fixed on said platform, said telescope vertically mounted to be rotated about its optical axis in said housing, a bracket rigidly fixed on the upper end of said telescope, a prism with two 35° angles, mirrored on its back side and facing directly toward an interesting star, said prism horizontally pivoted on said bracket above the opening of said telescope, the light from said interesting star and its adjacent field deviated by said prism to pass through said telescope, an aplanatic objective lens in said telescope, said lens focusing said light onto the focal plane of said telescope, a scanner disc placed in said focal plane to modulate the light therein, a synchronous scanner motor positioned concentricallly within the lower portion of said telescope, said scanner motor having a hollow rotor, said scanner disc attached to the lower end of said rotor to rotate therewith, the surface of said scanner disc being opaque except for a 10° sector therein, a set of achromatic collimating lenses, a cylindrical bracket fixed to said table to be concentric with and supporting the lower end of said telescope, said collimating lenses mounted in said cylindrical bracket, a photocell attached to said table, said collimating lenses directing said modulated light onto the cathode of said photocell, a bevel gear encircling the outer periphery of said telescope, a drive gear meshing with said bevel gear, a drive shaft extending through said cylindrical housing and keyed to said drive gear, a two-phase azimuth motor positioned outside said cylindrical housing and driving said drive shaft, an azimuth counter driven by said azimuth motor to continuously indicate the azimuth setting of said telescope, a reduction gear on the outer pivot of said prism, a two-phase elevation motor and connections for driving said reduction gear, an elevation counter driven by said elevation motor to continuously indicate the elevation setting of said prism.

7. A star tracker comprising a telescope, a cylindrical housing journalled to be rotated about its axis, said telescope rigidly fixed in said housing with its optical axis parallel to but offset from the rotating axis of said cylindrical housing, a prism pivotally mounted on said housing perpendicularly to said optical axis, to be rotatable with said housing on a radius equal to the offset distance of said optical axis, said prism being positioned to reflect light from a star into said telescope, said prism facing in a direction such that the line of sight from said star to said prism and thence into said telescope intersects and crosses the extended center line of said rotating axis, an elevation drive shaft extending through said housing parallel to and substantially on the opposite side of said rotating axis from said telescope, an elevation drive motor driving said shaft, connections on the upper end of said shaft for pivoting said prism to follow said star in elevation, an azimuth drive motor and connections for rotating said housing to follow said star in azimuth, said tracker being adapted to be installed within a structure having a window positioned across the field of view of said telescope and prism, with the center of said window substantially coincident with a point on said extended center line.

8. A star tracker adapted for installment on the fuselage of an airplane, including an optical system consisting of a telescope having the optical axis thereof in a substantially vertical position and a prism mounted to reflect light from a star into said telescope, said telescope and prism being rotatable as a unit in a substantially horizontal plane, a spherical glass dome placed over said prism and attached to said telescope, a flat optical window ground on said dome in the field of view of said prism, said dome protruding through a substantially horizontal hole in said fuselage into the airstream above said fuselage, and flexible means around the edge of said dome for connecting said dome to said airplane fuselage adjacent to said hole to permit said prism and dome to be movable together about three mutually perpendicular axes relative to said fuselage, said flexible connecting means being continuous around said dome to fill any and all gaps between said dome and said fuselage.

9. A star tracker adapted for installment on the fuselage of an airplane comprising: a telescope, a cylindrical housing journalled to be rotated about its axis, said telescope rigidly fixed in said housing with its optical axis parallel to but offset from the rotating axis of said housing, a prism pivotally mounted on said housing to be rotatable therewith, said prism being positioned to reflect light from a star into said telescope, said prism facing in a direction such that the line of sight from said star to said prism and thence into said telescope intersects and crosses the extended center line of said rotating axis, an elevation drive shaft extending through said housing parallel to and substantially on the opposite side of said rotating axis from said telescope, an elevation drive motor driving said shaft, connections on the upper end of said shaft for pivoting said prism to follow said star in elevation, an azimuth drive motor and connections for rotating said housing to follow said star in azimuth; a spherical glass dome of a given maximum size placed over said prism and said drive connections and rigidly secured to the outer top edge of said cylindrical housing, a flat optical window ground on said dome in the field of view of said prism, said dome protruding through a hole in said fuselage into the airstream above said fuselage, and flexible means around the edge of said dome for connecting said dome to said airplane fuselage adjacent to said hole to permit said star tracker to be movable about these mutually perpendicular axes relative to said fuselage, said flexible connecting means being continuous around said dome to fill any and all gaps between said dome and said fuselage, whereby for a given minimum elevation tracking angle and a fixed vertical location of said prism under said dome, a smaller minimum dome diameter is possible than if said telescope were rotatable only about said optical axis at the center of said dome, and whereby the interior of said fuselage can be pressurized.

10. An optical system comprising a telescope having the optical axis thereof in a substantially vertical position, a prism mounted to reflect light as from a star into said telescope, means for changing the angle of said prism with respect to said telescope to follow said star in elevation, means for rotating said telescope and said prism to follow said star in azimuth, a motor stator attached to said telescope, a hollow motor rotor journalled in said stator and positioned to surround the optical axis of said telescope, and a scanning disc attached to said rotor and positioned across the optical path through said telescope at the focal plane thereof for modulating said star-reflected light into signals indicating the direction of deviation of said star from the center of the field of view of said optical system, said scanning disc being divided into an opaque portion and a light-passing portion by lines thereon passing through said optical axis, and said disc being rotated by said rotor at a known reference speed whereby said light signals in passing through said scanning disc can be phase-compared with an electrical reference frequency equal to said reference speed.

11. Apparatus in accordance with claim 10 wherein said scanning disc is positioned at the lower end of said hollow motor rotor, said disc having substantially the same diameter as the inner diameter of said motor rotor whereby said rotor forms a baffle to tend to shield said focal plane from random light entering said telescope from sources other than said field of view, and including a plurality of baffle rings in said telescope between said rotor and said prism to shield said focal plane from said random light.

12. In an optical tracking system, a horizontally stabilized reference table, a hollow mount extending at a right angle from said table and fixed thereto, a telescope having an optical system adapted to form images at a focal plane therein, said telescope being rotatable about a fixed axis inside of said hollow mount, a prism mounted on the outer end of said telescope and rotatable therewith, said prism being positioned to reflect light as from a star into said telescope, means for changing the angle of said prism in elevation with respect to said table, means for indicating the elevation angle of said prism, means for rotating said telescope around the optical axis thereof in azimuth with respect to said table, means for indicating the azimuth angle, a scanning disc in the focal plane of said telescope, said disc being divided into opaque and light-passing portions by lines thereon passing through said optical axis, and means for rotating said scanning disc at a given reference speed about said optical axis, said means for rotating said scanning disc comprising a motor stator fixed to the inner wall of said telescope concentric therewith, and a hollow motor rotor journalled within said stator and surrounding said optical axis, with said scanning disc attached to said rotor across the optical path at said focal plane, whereby said star-reflected light passing through said disc provides light signals indicative of the direction of any deviation of said light from the center of said focal plane when phase-compared with a reference frequency equal to said reference speed.

13. Apparatus in accordance with claim 12 wherein said light-passing portion of said disc is a relatively narrow sector thereof.

14. Apparatus in accordance with claim 12 wherein said light-passing portion of said disc is a sector thereof having an angle of approximately 10 degrees.

15. An optical tracking system adapted for installation in the fuselage of an airplane at a given distance from a window having a given size in the outer surface of said fuselage, said tracking system comprising a housing journalled to be rotated about a substantially vertical housing axis, a telescope fixed in said housing with its optical axis parallel to but offset from said housing axis, and a reflective means pivotally mounted on a substantially horizontal axis to be rotatable with said housing and positioned to reflect light passing through said window, as from a star, into said telescope, said reflective means facing in a direction such that the line of sight from said star to said reflective means and thence into said telescope intersects and crosses the extended center line of said housing axis, said tracking system arranged to be rotatable with respect to said fuselage, whereby lower altitude-angle stars can be tracked with said given size of window than if said telescope were rotatable only about said optical axis.

16. An optical tracking system adapted for installation in the fuselage of an airplane at a given distance from a window having a given maximum size in the outer surface of said fuselage, said tracking system comprising a telescope, a cylindrical housing journalled to be rotated about its longitudinal axis, said telescope fixed in said housing with its optical axis parallel to but offset from the rotating axis of said housing, a prism pivotally mounted on said housing to be rotatable therewith, said prism being positioned to reflect light passing through said window, as from a star, into said telescope, said prism facing in a direction such that the line of sight from said star to said prism and thence into said telescope intersects and crosses the extended center line of said rotating axis, an elevation drive shaft extending through said housing parallel to and substantially on the opposite side of said rotating axis from said telescope, an elevation drive motor driving said shaft, connections on one end of said shaft for pivoting said prism to follow said star in elevation, and an azimuth drive motor and conections for rotating said housing to follow said star in azimuth, said tracking system arranged to be rotatable relative to said fuselage, whereby lower altitude-angle stars can be tracked with said given size of window than if said telescope were rotatable only about said optical axis at the same given distance from said window.

17. An optical tracking system adapted for installation in the fuselage of an airplane, said fuselage having a given size hole in the outer surface thereof, said tracking system comprising a housing journalled to be rotated about a substantially vertical housing axis, a telescope fixed in said housing with its optical axis parallel to but offset from said housing axis, a reflective means pivotally mounted on a substantially horizontal axis to be rotatable with said housing and positioned to reflect light as from a star into said telescope, said reflective means facing in a direction such that the line of sight from said star to said reflective means and thence into said telescope intersects and crosses the extended center line of said housing axis, and a window member having an edge-to-edge size commensurate with said fuselage hole placed over said reflective means and attached to said housing to rotate therewith, said tracking system arranged to be rotatable with respect to said fuselage and adapted to be located with said window member in cooperative relation with said fuselage hole, whereby lower altitude-angle stars can be tracked with a given window area than if said telescope were rotatable only about said optical axis in the center of said window.

18. Apparatus in accordance with claim 17 including flexible means around the edge of said window member for connecting said window to said airplane fuselage adjacent to said hole to permit said relative rotation of said tracking system with respect to said fuselage, said flexible connecting means being continuous around said window member to fill any and all gaps between said window and said fuselage, whereby the interior of said fuselage can be pressurized.

References Cited in the file of this patent

UNITED STATES PATENTS

| | | |
|---|---|---|
| 1,520,245 | Humbrecht | Dec. 23, 1924 |
| 1,530,081 | Humbrecht et al. | Mar. 17, 1925 |
| 2,077,398 | Clark | Apr. 20, 1937 |
| 2,102,587 | Eliel | Dec. 21, 1937 |
| 2,280,798 | Crane et al. | Apr. 28, 1942 |
| 2,372,939 | Elliott | Apr. 3, 1945 |
| 2,384,540 | Flint | Sept. 11, 1945 |
| 2,421,012 | Chew | May 27, 1947 |
| 2,424,193 | Rost et al. | July 15, 1947 |
| 2,437,463 | Ford | Mar. 9, 1948 |
| 2,462,925 | Varian | Mar. 1, 1949 |
| 2,488,239 | Rattray | Nov. 15, 1949 |
| 2,492,148 | Herbold | Dec. 27, 1949 |
| 2,513,367 | Scott | July 4, 1950 |

FOREIGN PATENTS

| | | |
|---|---|---|
| 352,035 | Great Britain | June 22, 1931 |
| 33,746 | Netherlands | Oct. 15, 1934 |